(12) United States Patent
Shaw

(10) Patent No.: US 8,606,665 B1
(45) Date of Patent: Dec. 10, 2013

(54) SYSTEM AND METHOD FOR ACQUIRING TAX DATA FOR USE IN TAX PREPARATION SOFTWARE

(75) Inventor: Neal Shaw, Shawnee, KS (US)

(73) Assignee: HRB Tax Group, Inc., Kansas City, MO (US)

( * ) Notice: Subject to any disclaimer, the term of this patent is extended or adjusted under 35 U.S.C. 154(b) by 823 days.

(21) Appl. No.: 11/855,724

(22) Filed: Sep. 14, 2007

Related U.S. Application Data

(63) Continuation-in-part of application No. 11/162,187, filed on Aug. 31, 2005.

(60) Provisional application No. 60/640,552, filed on Dec. 30, 2004.

(51) Int. Cl.
G06Q 40/00 (2012.01)

(52) U.S. Cl.
CPC ..................................... G06Q 40/00 (2013.01)
USPC .......................................................... 705/31

(58) Field of Classification Search
None
See application file for complete search history.

(56) References Cited

U.S. PATENT DOCUMENTS

| | | | |
|---|---|---|---|
| 4,128,758 A * | 12/1978 | Bukowski et al. ............ | 705/400 |
| 4,890,228 A | 12/1989 | Longfield | |
| 5,366,213 A * | 11/1994 | Polachak et al. ............. | 271/3.14 |
| 5,423,033 A | 6/1995 | Yuen | |
| 5,649,115 A | 7/1997 | Schrader et al. | |
| 5,724,523 A | 3/1998 | Longfield | |
| 5,842,185 A | 11/1998 | Chancey et al. | |
| 5,903,881 A | 5/1999 | Schrader et al. | |
| 6,032,137 A * | 2/2000 | Ballard ........................... | 705/75 |
| 6,202,052 B1 | 3/2001 | Miller | |
| 6,314,415 B1 | 11/2001 | Mukherjee | |
| 6,360,208 B1 | 3/2002 | Ohanian et al. | |
| 6,400,845 B1 | 6/2002 | Volino | |
| 6,411,938 B1 | 6/2002 | Gates et al. | |
| 6,446,048 B1 | 9/2002 | Wells et al. | |
| 6,473,741 B1 * | 10/2002 | Baker ............................. | 705/31 |
| 6,567,789 B1 | 5/2003 | Baker | |
| 6,589,290 B1 | 7/2003 | Maxwell et al. | |
| 6,611,809 B1 | 8/2003 | McCalden | |
| 6,687,681 B1 | 2/2004 | Schulz | |
| 6,898,574 B1 * | 5/2005 | Regan ............................ | 705/38 |
| 7,010,501 B1 * | 3/2006 | Roslak et al. .................. | 705/26 |

(Continued)

OTHER PUBLICATIONS

TurboTax, Inuit Press Release, details regarding Keen-Intuit Alliance to deliver live accounting advice 2 pages.

(Continued)

*Primary Examiner* — Bruce I Ebersman
(74) *Attorney, Agent, or Firm* — Erise IP, P.A.

(57) ABSTRACT

An automated system and method for acquiring tax data and importing it into tax preparation software. Tax documents are acquired electronically in a tax data acquisition process by scanning, faxing, or emailing them. Once a tax document is in electronic form, an optical character recognition (OCR) software process obtains tax data from the electronic tax document. Each piece of tax data that is obtained from the OCR software process is then imported into tax preparation software. Once the tax data has been imported into tax preparation software, the software may be used to complete a tax return. An important step in the tax return preparation process is automated so the need for tax professionals to spend time entering tax data into tax preparation software is reduced and data entry errors are reduced. Tax professionals may devote more time to preparing tax returns and less time to data entry.

18 Claims, 4 Drawing Sheets

(56) References Cited

U.S. PATENT DOCUMENTS

| | | | |
|---|---|---|---|
| 7,257,553 B1* | 8/2007 | Baker | 705/31 |
| 7,454,371 B2* | 11/2008 | Wyle et al. | 705/31 |
| 7,610,227 B2* | 10/2009 | Wyle | 705/31 |
| 7,636,886 B2* | 12/2009 | Wyle et al. | 715/277 |
| 2002/0013747 A1* | 1/2002 | Valentine et al. | 705/31 |
| 2002/0091602 A1 | 7/2002 | Stern et al. | |
| 2002/0111888 A1 | 8/2002 | Stanley et al. | |
| 2002/0133410 A1 | 9/2002 | Hermreck et al. | |
| 2002/0152165 A1* | 10/2002 | Dutta et al. | 705/43 |
| 2003/0036912 A1* | 2/2003 | Sobotta et al. | 705/1 |
| 2003/0101114 A1 | 5/2003 | Delapass et al. | |
| 2003/0188262 A1 | 10/2003 | Maxwell et al. | |
| 2004/0078271 A1 | 4/2004 | Morano et al. | |
| 2004/0078307 A1 | 4/2004 | Carver | |
| 2004/0083145 A1 | 4/2004 | Kobayashi et al. | |
| 2004/0088233 A1 | 5/2004 | Brady et al. | |
| 2004/0098664 A1* | 5/2004 | Adelman et al. | 715/500 |
| 2004/0181749 A1 | 9/2004 | Chellapilla et al. | |
| 2004/0205008 A1* | 10/2004 | Haynie et al. | 705/31 |
| 2004/0225581 A1* | 11/2004 | Wyle et al. | 705/31 |
| 2004/0243489 A1* | 12/2004 | Mitchell et al. | 705/30 |
| 2005/0033690 A1* | 2/2005 | Antognini et al. | 705/40 |
| 2005/0038722 A1* | 2/2005 | Throndson et al. | 705/31 |
| 2005/0097046 A1* | 5/2005 | Singfield | 705/42 |
| 2005/0125335 A1* | 6/2005 | Bross et al. | 705/39 |
| 2006/0085304 A1* | 4/2006 | Buarque De Macedo et al. | 705/31 |
| 2006/0155618 A1* | 7/2006 | Wyle | 705/31 |
| 2006/0155632 A1* | 7/2006 | Cherkas et al. | 705/36 R |
| 2007/0005509 A1* | 1/2007 | Spiller et al. | 705/65 |

OTHER PUBLICATIONS

Simi Valley computer User's Group, Description Turbo Tax, 14 pages, pp. 1-4 Feb. 2002.

\* cited by examiner

SYSTEM AND METHOD FOR ACQUIRING TAX DATA FOR USE IN TAX PREPARATION SOFTWARE

CROSS-REFERENCE TO RELATED APPLICATIONS

This application claims the benefit of U.S. patent application Ser. No. 11/162,187 filed Aug. 31, 2005 entitled SYSTEM AND METHOD FOR MIGRATING BETWEEN TAX RETURN PREPARATION SYSTEMS, which is incorporated herein by reference and which claims the benefit of U.S. Provisional Patent Application No. 60/640,552 filed Dec. 30, 2004 entitled SYSTEM AND METHOD FOR MIGRATING BETWEEN TAX RETURN PREPARATION SYSTEMS, which is incorporated herein by reference.

FIELD OF THE INVENTION

The present invention relates generally to systems and methods for preparing tax returns. In particular, the present invention relates to computerized systems and methods for acquiring tax data and importing it into tax preparation software.

BACKGROUND OF THE INVENTION

Data and other information necessary to compute federal, state, local, and foreign income tax liabilities is often reported to taxpayers on forms. For example, many U.S. employers use IRS Form W-2 to report yearly wages to their employees. Forms are also used to report various types of non-wage income, mortgage interest, student loans, distributions, benefits, etc. In many instances, the forms are computer generated and are then printed and mailed to taxpayers at the end of a tax year. Some taxpayers may receive many paper forms that have data needed to prepare their tax returns.

Individuals that use a tax preparation service typically submit all of their forms to a tax professional who manually enters data from the tax documents into tax preparation software that is used to complete tax returns for the taxpayers. Manual data entry is a time consuming activity that the tax professional must perform to provide tax preparation services. It consumes time that the tax professional could otherwise devote to preparing the tax return and providing assistance to a taxpayer. It also presents opportunities for data entry errors that could impact a taxpayer's tax liability. When the tax professional is asked to process a high volume of tax returns, delays in completing the tax returns may result simply because the tax professional does not have time to enter the tax data needed to complete the returns. There is need for an automated system and method for acquiring tax data that eliminates the need for tax professionals to spend time entering tax data into tax preparation software and that reduces data entry errors. There is need for an automated system and method for acquiring tax data that allows a tax professional to devote more time to preparing tax returns and less time to data entry.

SUMMARY OF THE INVENTION

The present invention is an automated system and method for acquiring tax data and importing it into tax preparation software. It provides a new system and method for entering data from tax documents into tax preparation software by using a scanner to read and import information from a tax document. Tax documents are acquired electronically in an acquire source tax document process by scanning, faxing, or emailing them. Once a tax document is in electronic form, an optical character recognition (OCR) software process obtains tax data from the electronic tax document. Each piece of tax data that is obtained from the OCR software process is then imported into tax preparation software. Once the tax data has been imported into tax preparation software, the software may be used to complete a tax return.

This present invention facilitates operations in professional tax preparation retail offices where a large number of individual taxpayers may request services at the same time and where a high volume of service requests can result in a delay in entering tax data for processing of returns. The present invention automates an important step in the tax return preparation process. The need for tax professionals to spend time entering tax data into tax preparation software is reduced and data entry errors are reduced. The present invention allows a tax professional to devote more time to preparing tax returns and less time to data entry.

DESCRIPTION OF EXAMPLE EMBODIMENTS

The present invention is based on various known tax preparation systems and methods including Retail Tax Preparation System (RTPS) which is software used by tax professionals at retail tax preparation offices such as H&R Block to calculate taxpayers' tax liabilities, check for problems, prepare the proper tax forms for the taxpayers returns, and optionally file tax returns on behalf of retail taxpayer customers.

Figure 1:
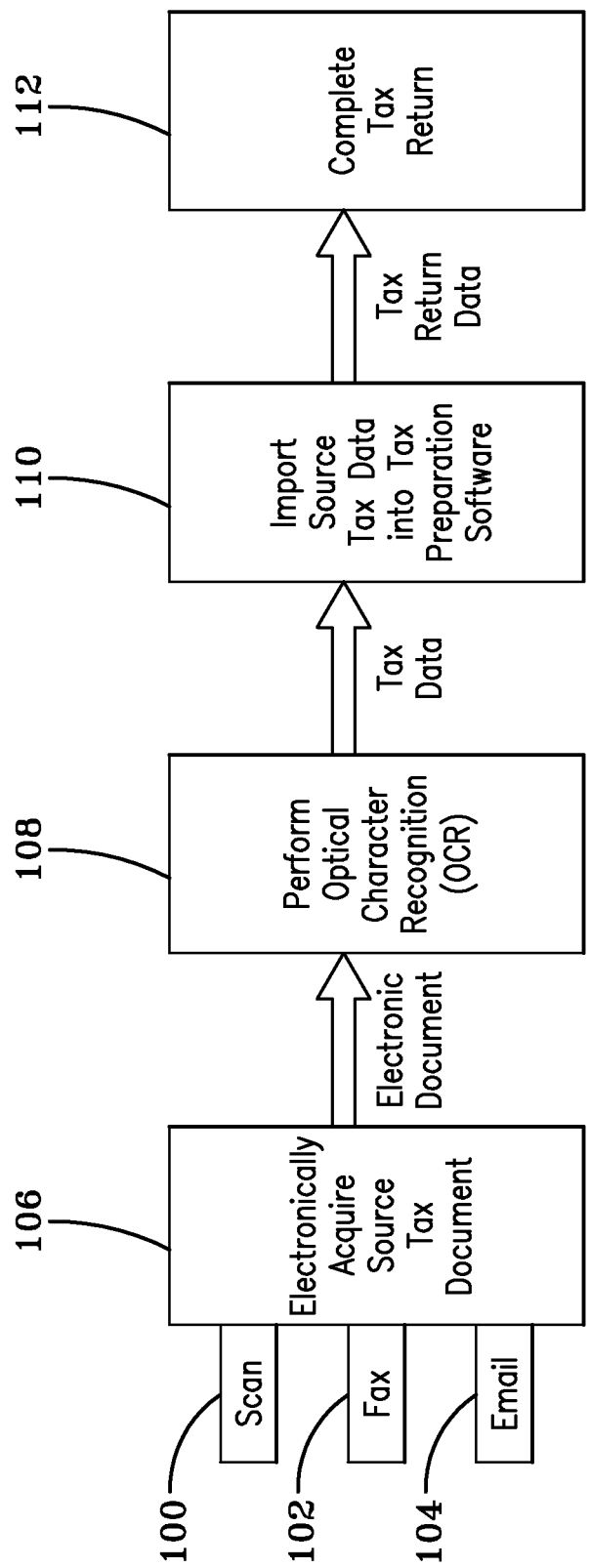
FIG. 1 is a block diagram of a tax data acquisition and importation system according to an example embodiment of the present invention.

Referring to FIG. 1, a block diagram of a tax data acquisition and importation system and method according to an example embodiment of the present invention is shown. Table 1 provides a list of commonly used forms for reporting various types of tax data.

TABLE 1

| U.S. IRS Form | Description |
| --- | --- |
| W-2 | Wage and Tax Statement |
| W-2G | Certain Gambling Winnings |
| 1042-S | Foreign Person's U.S. Source Income Subject to Withholding |
| 1098 | Mortgage Interest Statement |
| 1098-E | Student Loan Interest |
| 1098-T | Tuition Statement |
| 1099-A | Acquisition or Abandonment of Secured Property |
| 1099-B | Proceeds from Broker and Barter Exchange Transactions |
| 1099-CAP | Changes in Corporate Control and Capital Structure |
| 1099-C | Cancellation of Debt |
| 1099-INT | Interest Income |
| 1099-DIV | Dividends and Distributions |
| 1099-G | Certain Government Payments |
| 1099-H | Health Coverage Tax Credit (HCTC) Advance Payments |
| 1099-LTC | Long-Term Care and Accelerated Death Benefits |
| 1099-MISC | Miscellaneous Income |
| 1099-OID | Original Issue Discount |
| 1099-PATR | Taxable Distributions Received from Cooperatives |

TABLE 1-continued

| U.S. IRS Form | Description |
| --- | --- |
| 1099-Q | Payments From Qualified Education Programs (Under Sections 529 and 530) |
| 1099-R | Distributions from Pensions, Annuities, Retirement, or Profit-Sharing Plans, IRAs, Insurance Contract, etc. |
| 1099-S | Proceeds from Real Estate Transactions |
| 1099-SA | Distributions From an HSA, Archer MSA, or Medicare Advantage MSA |
| 5498 | IRA Contribution Information |
| 5498-ESA | Coverdell ESA Contribution Information |
| 5498-SA | HSA, Archer MSA, or Medicare Advantage MSA Information |

Tax documents such as those listed in Table 1 are acquired electronically in an acquire source tax document process 106 by scanning 100, faxing 102, or emailing 104 them. The acquire source tax document process 106 may operate locally and accept documents that are scanned on a local scanner. Alternatively, the tax documents may be submitted from remote locations by fax or email to the acquire source tax document process 106. The tax documents may be faxed or emailed by a taxpayer who receives them from an employer, one or more financial institutions, or any other tax data provider. Alternatively, the tax documents may be faxed or emailed to the acquire source tax document process 106 directly from the employer, financial institution, or other tax data provider. The tax documents may be stored in or associated with an account for the taxpayer that is later accessed to complete further processing of the tax documents. Electronic tax documents that result from the acquire source tax document process 106 may be in .pdf, .tif, .jpg, or any other electronic image format that may be processed through OCR software.

Once a source tax document is in electronic form, an optical character recognition (OCR) software process obtains tax data from the electronic document. Captiva® InputAccel® and Kofax® Ascent Capture® are products that provide the OCR processing that could be used in the OCR software process 108. Each source tax document is processed for relevant tax data.

Each piece of tax data that is obtained from the OCR software process 108 is then imported into tax preparation software 110. The tax preparation software may be RTPS used by tax professionals in a retail office that prepares tax returns for taxpayer customers. Once the tax data has been imported into tax preparation software 110, the software may be used to complete a tax return 112.

Alternatively, the software into which tax data is imported 110 may be self-serve tax preparation software that is used by individuals to prepare their own tax returns. The tax return preparation software may be accessible to individual taxpayers via a web site. A taxpayer may fax or email source tax documents that are accepted at a remote acquire source tax document process 106 for further processing. The OCR process 108 may be performed at the remote site and the resulting tax data imported into the tax preparation software 110 accessible via the web site. The taxpayer may then interact with the tax preparation software operational at the web site and complete the tax return 112 using tax data from the source tax documents that were faxed or emailed. In another embodiment of the present invention, the tax data acquired from the source tax documents may be accessed from the web site and transferred to tax preparation software operational on the taxpayer's personal computer. The taxpayer may then interact with the tax preparation software operational at the personal computer and complete the tax return 112 using tax data from the source tax documents that were faxed or emailed.

Figure 2A:
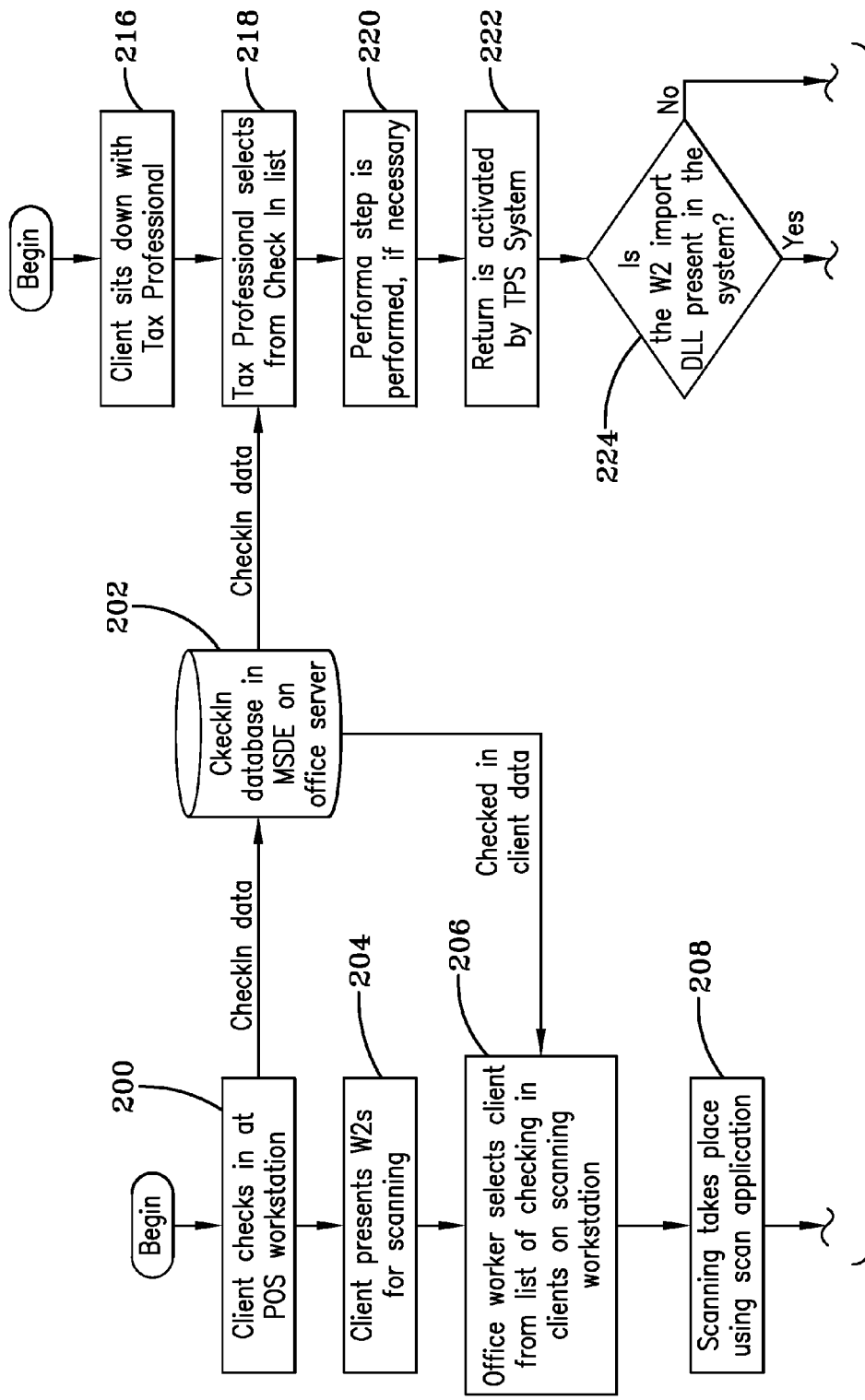
FIG. 2 is a flowchart of a tax data acquisition and importation method according to an example embodiment of the present invention.
Figure 2B:
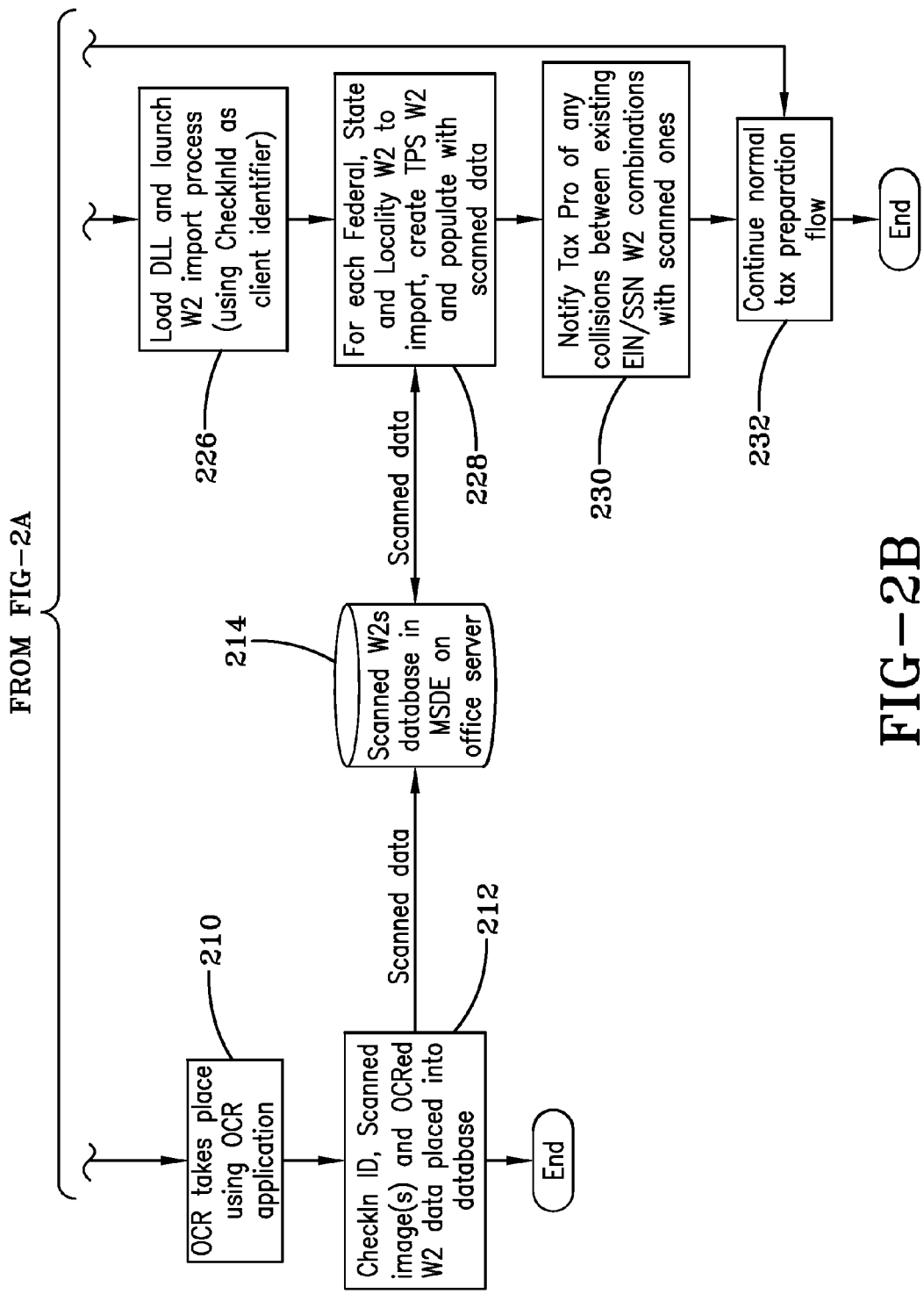

Referring to FIG. 2, a flowchart of a tax data acquisition and importation method according to an example embodiment of the present invention is shown. The process begins when a taxpayer checks in at a point-of-sale workstation at a retail tax office 200. Check-in data such as contact information and preferences are entered into the workstation and saved in a database on an office server at the retail tax office 202. Next, the taxpayer presents W-2 and other tax documents to be scanned 204. An office representative reviews the taxpayer check-in data by locating the taxpayer from list of taxpayer clients at the retail tax office 206. Next, the taxpayer's tax documents are scanned using document scanning software 208. OCR software is applied to the scanned tax documents to identify tax data for using in preparing the tax return 210. The scanned tax data is saved in an office server database along with the taxpayer's contact and other information and a check-in identifier for the taxpayer 212, 214.

Once the scanning process is complete, preparation of the tax return begins. The taxpayer meets with a tax professional at the retail tax office who prepares the return for the taxpayer 216. The tax professional selects the taxpayer from a list of taxpayer clients at the retail tax office 218. If the taxpayer has used the retail tax office previously for preparation and filing of a tax return, taxpayer data for use in preparing the current year tax return may be obtained from a database comprising tax return data 220. Preparation of the tax return is then activated in the RTPS 222.

In an example embodiment of the present invention, tax data importation occurs when presence of a data import module is detected. In an example embodiment of the present invention implemented for operation on a Microsoft® Windows® platform, the data import module may be implemented as a DLL file. If the data import module is present 224, it is loaded and launched to start the data import process 226. The taxpayer's check-in identifier is used to locate the tax data to be imported into RTPS 226. Next, W-2 imported tax data from various sources is located 228 from the database comprising scanned data 214. Other types of tax data may also be located for importation into the tax preparation software. In the next step 230, scanned data is compared with data from other sources to identify any discrepancies or conflicts. For example, tax forms for the taxpayer may have been scanned or submitted previously without performing an OCR process to obtain tax data from them. The tax professional is notified of the existence of the forms. He or she can compare data on the electronic forms with the scanned tax data and resolve any problems that are detected. Finally, preparation of the tax return proceeds using the scanned data 230. If the data import module is not present 224, RTPS operates in a standard mode in which tax data needed to complete the tax return is obtained from other sources 232.

The use of a data import module such as a DLL file for the Microsoft Windows platform allows tax data import functionality to be integrated with tax preparation software as needed or desired. Confirmation that the data import module is present and loaded at the appropriate time during tax return preparation flow can be communicated to a tax professional or preparer using a pop-up a message confirming that the positive case has been reached. In the negative case, nothing happens at the same time in the tax return preparation flow when the data import module is not present. This design minimizes the impact to tax professionals or preparers if the scanning and data import functionality is introduced to each retail tax office separately or according to a particular schedule. A phased introduction of the functionality allows each retail tax office to obtain the equipment (e.g., scanner) that is needed to offer the service to taxpayers. The data import functionality can then be invoked once the retail tax office has everything it needs to offer the service.

In RTPS, once a return has been started (i.e., tax return data from prior years has been located or the taxpayer information screen has been completed), the hook to the data import module is invoked. In an example embodiment of the present invention, there are two conditions that cause the data import module functionality be invoked. First, a taxpayer has completed the check-in process and has been assigned a valid identifier or check-in ID (i.e., a non-zero check-in ID). Taxpayers that do not complete the check-in process have an unassigned or zero value identifier so the data import module is not invoked. Second, the data import module is detected and determined to be present.

If either of the conditions noted above are false (the negative case), there is no discernable difference in tax return preparation flow to the user of the RTPS. No error message is displayed or logged. If both of the conditions noted above are true (the positive case), a particular method is invoked in the data import module. During a testing phase, the data import module may be implemented as a simple stub DLL in which a method that displays a quick message to the tester confirm that the loading and invoking of the DLL functionality succeeded. The complete DLL that provides the data import functionality may connect to a database on the office server and import any un-imported tax data values for taxpayer into the tax return.

Figure 3:
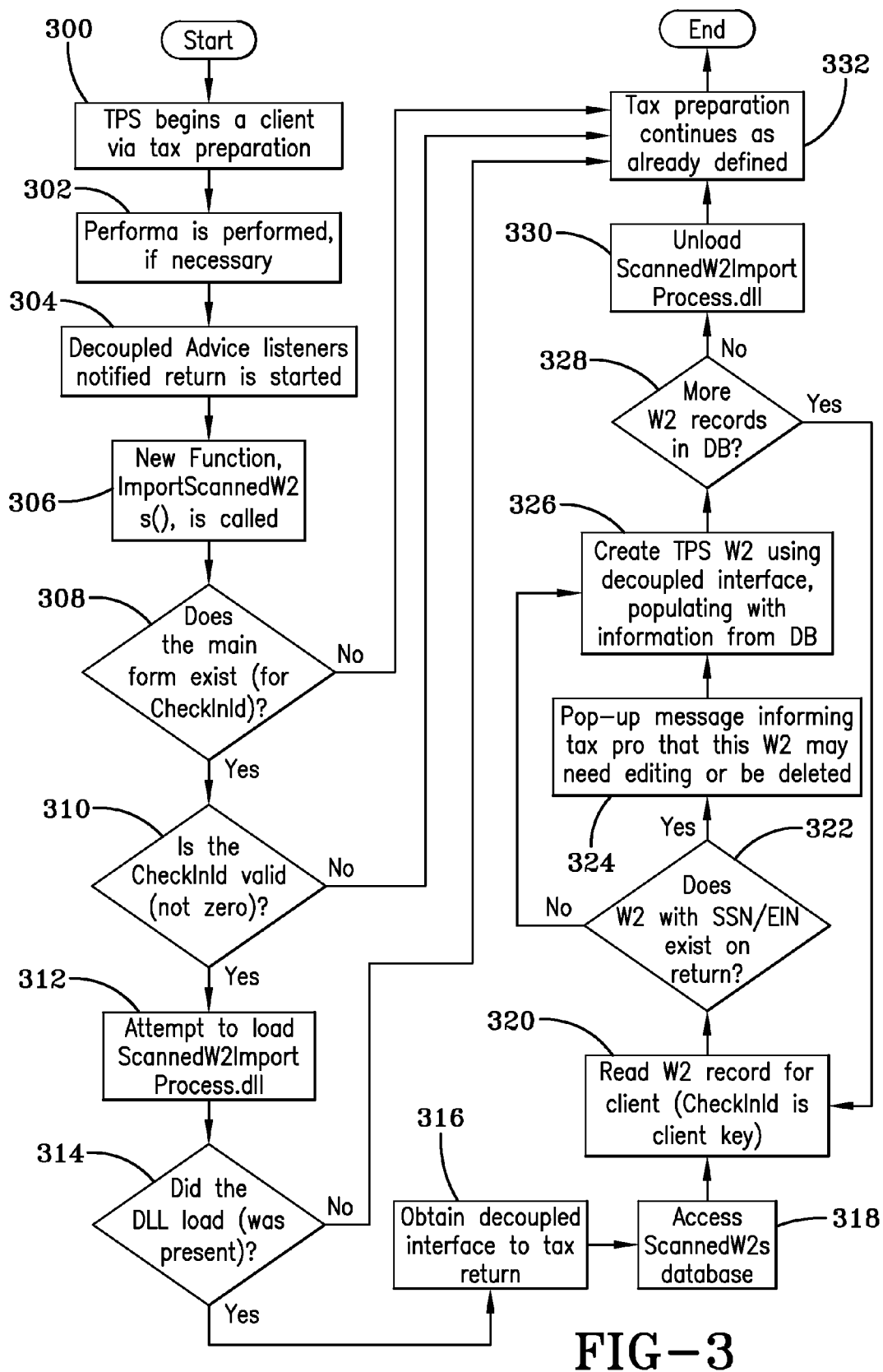
FIG. 3 is a flowchart of a tax preparation method using imported tax data according to an example embodiment of the present invention.

Referring to FIG. 3, a flowchart of a tax preparation method using imported tax data according to an example embodiment of the present invention is shown. A tax professional begins the tax preparation process for a taxpayer using RTPS 300. If the taxpayer has used the retail tax office previously for preparation and filing of a tax return, taxpayer data for use in preparing the current year tax return may be obtained from a database comprising tax return data 302. In an example embodiment of the present invention in which tax advice is provided to the taxpayer upon completion of the tax return, software modules (decoupled advice listeners) for collecting and analyzing tax data are invoked 304. They are notified that preparation of a tax return has started so that the appropriate data may be collected during the preparation and analyzed to provide the taxpayer with appropriate advice.

Next, the scanned data importation process is started 306. The presence of scanned tax data for the taxpayer is verified according to the taxpayer's check-in identifier 308. If the taxpayer has a check-in identifier 310, the data import module is located to start the data import process 312. If the data import module is present, it is loaded and launched 314. An interface module for obtaining the scanned data is invoked to retrieve scanned data for the tax return 316. The interface module accesses the scanned data repository 318 and using the check-in identifier for the taxpayer, reads the appropriate scanned tax data 320. Next, the data import module determines whether a form corresponding to the scanned tax data exists 322. If the corresponding form exists, the tax professional is informed so that any discrepancies or conflicts between the form tax data and the scanned tax data may be resolved 324. If the corresponding form does not exist, it can be created and populated with the scanned tax data for submission with the tax return filing 326. Checks for additional tax data are completed in step 328 and steps 320-326 are repeated if additional tax data is present. When no additional tax data is found, the data import module is unloaded 330 and tax preparation continues according to a standard mode 332.

The present invention automates an important step in the tax return preparation process. It acquires and imports tax data by scanning tax forms and applying an OCR process to identify tax data for use with tax preparation software. Each tax data value is associated with a taxpayer identifier and saved in a database so that it can be located and imported into tax preparation software during the tax return preparation process. The need for tax professionals to spend time entering tax data into tax preparation software is reduced and furthermore, data entry errors are reduced. The present invention allows a tax professional to devote more time to preparing tax returns and less time to data entry.

While example embodiments of the invention have been illustrated and described, various modifications and combinations can be made without departing from the spirit and scope of the invention. For example, the types of tax documents that are acquired and processed may vary according the requirements of relevant tax authorities. The processes of the present invention may be modified to accept any type of tax document. Furthermore, the systems and methods for obtaining electronic tax documents may be modified in many ways and fall within the scope of the present invention. Modifications, combinations, and equivalents to the system and method of the present invention are intended to be covered and claimed.

What is claimed is:

1. A computerized method for preparing a tax return comprising the steps of:
  (a) assigning at a first computer a check-in identifier to each of a plurality of taxpayers completing a check-in procedure at a retail tax office;
  (b) acquiring at said first computer a plurality of source tax documents in an electronic image format, said source tax documents corresponding to paper tax documents and comprising tax data for one of said taxpayers;
  (c) applying at said first computer an optical character recognition process to each of said source tax documents to identify tax data values in each of said source tax documents;
  (d) associating said tax data values from each of said source tax documents with said assigned check-in identifier for said taxpayer;
  (e) associating each of said source tax documents in electronic image format with said assigned check-in identifier for said taxpayer;
  (f) saving in a database said assigned check-in identifier and said associated tax data values and said source tax documents in electronic image format;
  (g) receiving at a second computer executing tax preparation software said assigned check-in identifier;
  (h) in response to receiving said assigned check-in identifier, detecting at said second computer a data importation module in communication with said tax preparation software;
  (i) in response to detecting said data importation module, loading at said second computer said data importation module to retrieve from said database said tax data values associated with said assigned check-in identifier;
  (j) importing said tax data values into said tax preparation software at said second computer;
  (k) displaying at said second computer a notification of existence of source tax documents in electronic image format associated with said assigned check-in identifier;
  (l) in response to a user request, displaying at said second computer said source tax documents in electronic image format;

(m) calculating at said second computer a tax liability for said taxpayer using said tax data values; and (n) preparing at said second computer a tax return for said taxpayer comprising said tax liability calculated using said tax data values.

2. The computerized method of claim 1 wherein said tax preparation software at said second computer is a tax preparation system used by a tax professional to prepare an individual tax return for said taxpayer.

3. The computerized method of claim 1 wherein said tax preparation software at said second computer is self-serve tax preparation software used by said taxpayer to prepare an individual tax return.

4. The computerized method of claim 3 wherein said self-serve tax preparation software is selected from the group consisting of self-serve tax preparation software operational at a web site and self-serve tax preparation software operational on said second computer.

5. The computerized method of claim 1 wherein acquiring at a first computer a plurality of source tax documents in electronic image format comprises scanning said source tax documents.

6. The computerized method of claim 1 wherein acquiring at a first computer a plurality of source tax documents in electronic image format comprises faxing said source tax documents.

7. The computerized method of claim 1 wherein acquiring at a first computer a plurality of source tax documents in electronic image format comprises emailing said source tax documents.

8. A computerized system for preparing a tax return comprising:

a server comprising a plurality of software processes for obtaining tax data values, said processes comprising:

(a) an acquire source tax document process for obtaining in electronic image format tax documents corresponding to paper tax documents and comprising tax data for a plurality of taxpayers;

(b) an optical character recognition process for identifying tax data values in said electronic image format tax documents;

(c) a store data process for storing an assigned check-in identifier for one of said taxpayers with:

(i) said tax data values from each of said source tax documents; and (ii) said electronic image format tax documents from each of said source tax documents;

(d) an import source tax data process for:

(i) locating said tax data values for said taxpayer according to said assigned check-in identifier;

(ii) importing said tax data values into tax preparation software; and a client computer comprising tax preparation software for:

(e) displaying at said client computer a notification of existence of said electronic image format tax documents;

(f) in response to a user request, displaying at said second computer said source tax documents in electronic image format;

(g) calculating at said client computer a tax liability for said taxpayer using said imported tax data values; and (h) completing at said client computer a tax return for said taxpayer comprising said calculated tax liability.

9. The system of claim 8 wherein said tax preparation software is a tax preparation system used by a tax professional to prepare an individual tax return for said taxpayer.

10. The system of claim 8 wherein said tax preparation software is self-serve tax preparation software used by said taxpayer to prepare an individual tax return.

11. The system of claim 8 wherein said self-serve tax preparation software is selected from the group consisting of self-serve tax preparation software operational at a web site and self-serve tax preparation software operational on a personal computer.

12. The system of claim 8 wherein said acquire source tax document process obtains electronic image format tax documents using a scanning process.

13. The system of claim 8 wherein said acquire source tax document process obtains electronic image format tax documents by fax.

14. The system of claim 8 wherein said acquire source tax document process obtains electronic image format tax documents by email.

15. A computerized method for preparing a tax return at a retail tax office comprising:

(a) assigning in a first computer a check-in identifier to a taxpayer completing a check-in procedure at a retail tax office;

(b) obtaining paper tax documents from said taxpayer, said paper tax documents comprising tax data for completing a tax return;

(c) scanning at said first computer said tax documents from said taxpayer to create electronic image format tax documents comprising tax data;

(d) applying at said first computer an optical character recognition process to said electronic tax documents to identify tax data values in said electronic tax documents;

(e) associating at said first computer said tax data values with said check-in identifier;

(f) associating at said first computer said electronic image format tax documents with said check-in identifier;

(g) saving said check-in identifier, said electronic image format tax documents, and said tax data values in a database;

(h) activating at a second computer tax preparation software for completing a tax return;

(i) receiving at said second computer said check-in identifier;

(j) in response to receiving said check-in identifier, detecting a data importation module in communication with said tax preparation software;

(k) in response to detecting said data importation module, loading at said second computer said data importation module to import said tax data values into said tax preparation software at said second computer using said check-in identifier to locate said tax data values from said database;

(l) displaying at said second computer a notification of existence of said electronic image format tax documents;

(m) in response to a user request, displaying at said second computer said source tax documents in electronic image format;

(n) calculating a tax liability using said imported tax data values; and (o) completing at said second computer said tax return with said tax liability.

16. The computerized method of claim 15 further comprising correcting discrepancies between said tax data values and data from said electronic image format tax documents.

17. The computerized method of claim 15 further comprising creating a tax form comprising said tax data values.

18. The computerized method of claim 15 further comprising electronically filing said tax return comprising imported tax data values.

* * * * *